United States Patent [19]

Slat et al.

[11] Patent Number: 4,479,771

[45] Date of Patent: Oct. 30, 1984

[54] IN-MOLD LABEL DISPENSER FOR MULTIPLE CAVITY BLOW MOLDING MACHINE

[75] Inventors: William A. Slat, Brooklyn, Mich.; Richard C. Darr, Seville, Ohio; Richard L. Dunlap, Cairo, Ohio; Craig A. Larson, Westfield Court, Ohio

[73] Assignee: Plastipak Packaging, Inc., Plymouth, Mich.

[21] Appl. No.: 543,601

[22] Filed: Oct. 20, 1983

[51] Int. Cl.³ .................... B29C 5/06; B29C 27/14
[52] U.S. Cl. .................. 425/503; 264/509; 271/9; 271/14; 425/504; 425/182
[58] Field of Search ........... 264/509; 425/503, 504, 425/185, 186, 188, 451.5, 451.6, 182; 271/9, 14, 11, 107

[56] References Cited

U.S. PATENT DOCUMENTS

| | | |
|---|---|---|
| 2,319,156 | 5/1943 | Perkins ................... 264/247 |
| 3,108,850 | 10/1963 | Brandt ................... 264/509 |
| 3,151,193 | 9/1964 | Thornton . |
| 3,207,822 | 9/1965 | Makowski .............. 264/537 |
| 3,227,787 | 1/1966 | Battenfeld . |
| 3,267,186 | 8/1966 | Battenfeld . |
| 3,272,681 | 9/1966 | Langecker ............. 264/509 |
| 3,287,198 | 11/1966 | Battenfeld ............. 264/509 |
| 3,292,209 | 12/1966 | Borkmann . |
| 3,324,508 | 6/1967 | Dickinson . |
| 3,608,020 | 9/1971 | Langecker ............. 425/503 |
| 3,657,405 | 4/1972 | Langecker . |
| 3,674,391 | 7/1972 | Welle . |
| 3,759,643 | 9/1973 | Langecker . |
| 3,759,645 | 9/1973 | Langecker . |
| 3,801,689 | 4/1974 | Langecker . |
| 3,860,375 | 1/1975 | Kinslow, Jr. et al. ........ 425/186 |
| 4,355,967 | 10/1982 | Hellmer . |
| 4,359,314 | 11/1982 | Hellmer . |
| 4,394,011 | 7/1983 | Dalton ................... 271/14 |
| 4,397,625 | 8/1983 | Hellmer et al. ........ 425/503 |

Primary Examiner—Jan Silbaugh
Assistant Examiner—Hubert C. Lorin
Attorney, Agent, or Firm—Brooks & Kushman

[57] ABSTRACT

An in-mold label dispenser (10) is disclosed for supplying labels to a multiple cavity blow molding machine (12) for an in-mold labeling process. Label dispenser (10) includes a dispensing head (24) mounted for movement between a withdrawn position free of the mold and an inserted position between mold sections in an open position of the mold. A plurality of label carriers (26) are mounted on the dispensing head (24) for movement between retracted and extended positions in order to receive labels (32) from magazines (28) and supply the labels to the mold. A drive mechanism (30) moves the dispensing head (24) and the label carriers (26) for the in-mold label dispensing. Preferably, the dispensing head (24) is mounted on a support (34) and is moved in a hesitating manner to receive labels. The dispensing head support (34) is preferably mounted on a frame (38) in a manner that conserves floor space and the frame is also mounted in order to permit access to the associated blow molding machine. A linkage assembly (64) mounts the label carriers (26) on the dispensing head (24). The drive mechanism (30) preferably includes an actuator (98) that drives the linkage assembly (64) and a rack and gear drive (118) that drives the dispensing head.

16 Claims, 9 Drawing Figures

IN-MOLD LABEL DISPENSER FOR MULTIPLE CAVITY BLOW MOLDING MACHINE

TECHNICAL FIELD

This invention relates generally to blow molding machines and, more particularly, to an in-mold label dispenser for a blow molding machine.

BACKGROUND ART

Blow molding machines conventionally include an extruder that extrudes a tube of hot plastic between open sections of a mold. Closing of the mold then clamps the tube and allows air to be blown into the tube such that it assumes the shape of the mold. After suitable cooling has taken place, the mold sections are opened to allow ejection of the molded part.

Blow molded parts such as containers have conventionally included papers labels that are glued thereto after the molding to identify the contents of the container to the consumer. One problem with such paper labels is that they can become wrinkled if dampened and can also become detached from the container if a waterproof glue is not used. Also, paper labels require a separate labeling step after the molding which thus adds to the cost of the container.

In-mold labeling has been developed in the recent past for use with single cavity blow molding machines to provide superior bonding of labels to blow molded parts. This in-mold labeling is performed by inserting one or more labels within the mold prior to the extrusion of the hot plastic tube and subsequent closing of sections of the mold to enclose the plastic tube and each label within a single cavity of the mold in preparation for the blowing operation. The subsequent blowing operation forms the hot plastic tube around each label to the shape of the mold and activates a heat sensitive adhesive that provides a permanent bond which is incapable of being broken by moisture or otherwise. Also, such in-mold labeling provides a smooth transition between the label and the adjacent surface of the molded part and further provides additional strength since the label cooperates with the plastic in resisting deformation. Such strengthening also allows the use of less plastic to blow mold the part and thereby reduces the ultimate cost to the consumer. Furthermore, when utilized with containers for carbonated beverages, it is believed that in-mold labeling may reduce the flow of carbon dioxide out through the container wall over a period of time and thereby increases the shelf life.

Prior in-mold label dispensers for single cavity blow molding machines conventionally include a label carrier having vacuum cups that receive a label from a label magazine and then are movable to deposit the label within the mold cavity whereupon termination of a vacuum drawn at the cups allows a vacuum drawn at the mold cavity to secure the label in position in preparation for the molding. Such vacuum carriers have previously been mounted on pivotal arms that move in an angular path with respect to the direction of opening and closing movement of mold sections of the mold in order to permit depositing of the labels in the confined space permitted by the extent of the mold opening. With the pivotal arm type of label carrier, only one label can be deposited within the mold at a given time since movement thereof on the pivotal arm toward one mold section interferes with pivotal movement of a similar arm toward an opposed mold section for depositing another label.

Another prior art type of in-mold label dispenser for single cavity blow molding machines includes a label carrier that is moved along an abruptly curved path by a complex linkage which executes a 180 degree turn in order to transfer labels from a label magazine to the mold in preparation for molding. With this complex linkage type label dispenser, it is likewise not possible to deposit more than one label in the mold at a given time due to the limited space present upon opening of the mold.

Both of the prior art types of label dispensers described above for in-mold labeling of single cavity blow molding machines have an increased cycle time due to the necessity of depositing labels sequentially rather than at the same time.

Prior art in-mold labeling of single cavity blowing machines is disclosed by U.S. Pat. Nos.: 3,108,850; 3,151,193; 3,207,822; 3,227,787; 3,267,186; 3,272,681; 3,287,198; 3,292,209; 3,324,508; 3,608,020; 3,657,405; 3,674,391; 3,759,643; 3,759,645; 3,801,689; 4,355,967; and 4,359,314.

A further in-mold label dispenser which has been developed utilizes a dispensing head that is movable rectilinearly along a first axis to between open sections of a single cavity mold. At least one label carrier is mounted on the dispensing head for rectilinear movement along a second axis transverse to the first axis between retracted and extended positions. A label magazine associated with each label carrier supplies labels that are deposited within the mold cavity in preparation for the blow molding operation. With this dispenser, more than one label can be supplied to the mold at a given time to thus decrease the cycle time.

Blow molding machines with multiple cavity mold sections are also commercial used at the present time to simultaneously blow mold a plurality of parts. Heretofore, in-mold labeling of such multi-cavity blow molding machines has not been possible since no label dispenser has previously been developed for such machines.

DISCLOSURE OF INVENTION

An object of the present invention is to provide an in-mold label dispenser for a multiple cavity blow molding machine of the type which includes a mold having a pair of mold sections that are movable between open and closed positions and define a plurality of cavity sections that cooperatively define a plurality of mold cavities in the closed position.

In carrying out the above object, the label dispenser of the invention includes a dispensing head mounted for movement between a withdrawn position free of the mold and an inserted position between the mold sections in the open position. A plurality of label carriers are mounted on the dispensing head for movement between retracted and extended positions. These label carriers are respectively located in alignment with the cavity sections of the mold in the open position upon movement of the dispensing head to the inserted position. At least one label magazine is provided for supplying labels to the label carriers prior to movement of the dispensing head from the withdrawn position to the inserted position. A drive mechanism of the dispenser moves the dispensing head between the withdrawn and inserted positions and moves the label carriers between the retracted and extended positions to deposit labels from the magazine within the mold cavity sections in preparation for molding.

In the preferred construction, at least two label magazines are located at one side of the dispensing head. A support is also provided on which the dispensing head is movable. Initially, the dispensing head is moved in a hesitating manner alongside the label magazines for securement of at least two labels to associated label carriers at a time. After securement of labels to all of the label carriers, the dispensing head is movable to the inserted position whereupon the label carriers are moved to the extended positions in order to respectively deposit the labels in the multiple cavity sections of the mold.

A frame of the label dispenser is also preferably provided with the dispensing head support mounted on the frame for movement between a first position where the dispensing head is moved in the hesitating manner for securement of the labels to the carriers and a second position where the dispensing head is moved between the withdrawn and inserted positions. The support on which the dispensing head is mounted is preferably mounted on the frame for pivotal movement about a general horizontal axis between the first position where the support extends generally vertically and the second position where the support extends generally horizontally.

The preferred construction of the label dispenser also includes a base and a connection that mounts the dispensing head frame on the base for movement between a use position adjacent the associated blow molding machine and an access position that allows access to the blow molding machine for servicing such as maintenance or repair. This connection is preferably provided as a pivotal connection having a vertical axis of rotation about which the dispensing head frame is pivotally supported on the base for movement between the use and access positions.

The preferred construction of the drive mechanism of the label dispenser includes a parallelogram linkage assembly that supports the label carriers on the dispensing head for movement between the retracted and extended positions. First and second sections of the dispensing head are also preferably provided, and the parallelogram linkage assembly includes first and second sets of parallelogram linkages that respectively mount first and second sets of the label carriers on the first and second sections of the dispensing head for movement in opposite directions as each other between the retracted and extended positions in order to supply labels to the cavity sections of both mold sections of the mold. A detachable connector of the linkage assembly connects the first and second sets of parallelogram linkages on the first and second sections of the dispensing head for coordinated movement of the first and second sets of label carriers between the retracted and extended positions and also permits disconnection of the first and second sets of parallelogram linkages when the labels are to be supplied to only the cavity sections of one mold section of the mold. A detachable connection between the first and second sections of the dispensing head permits removal of one dispensing head section when the labels are to be supplied to only the cavity sections of one mold section of the mold.

As disclosed, the parallelogram linkage assembly preferably includes a pair of connecting rods respectively associated with the first and second sections of the dispensing head. These connecting rods respectively connect the linkages of the first and second sets of parallelogram linkages on the first and second sections of the dispensing head in order to provide the coordinated movement of the linkages on each dispensing head section.

The drive mechanism of the label dispenser also includes an actuator that drives the linkage assembly to move the label carriers between the retracted and extended positions. In addition, the drive mechanism preferably includes a rack and gear drive that moves the dispensing head between the withdrawn and inserted positions with respect to the mold sections of the mold.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
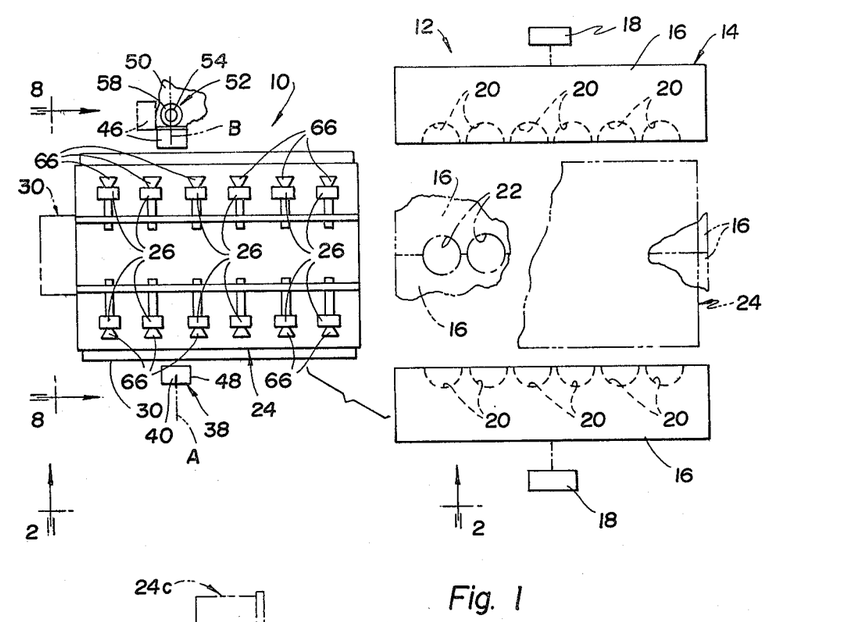
FIG. 1 is a schematic plan view of an in-mold label dispenser that is constructed in accordance with the present invention and illustrated for use with an associated blow molding machine.

With reference to FIG. 1 of the drawings, an in-mold label dispenser in accordance with the present invention is generally indicated by reference numeral 10 and is utilized with a plastic blow molding machine schematically indicated by 12. A mold 14 of the blow molding machine includes a pair of mold sections 16 that are moved by associated actuators 18 between the open position shown by solid line representation and the closed position shown by phantom line representation. Each mold section 16 includes a plurality of cavity sections 20 that cooperatively define a plurality of mold cavities 22 in the closed position.

Figure 2:
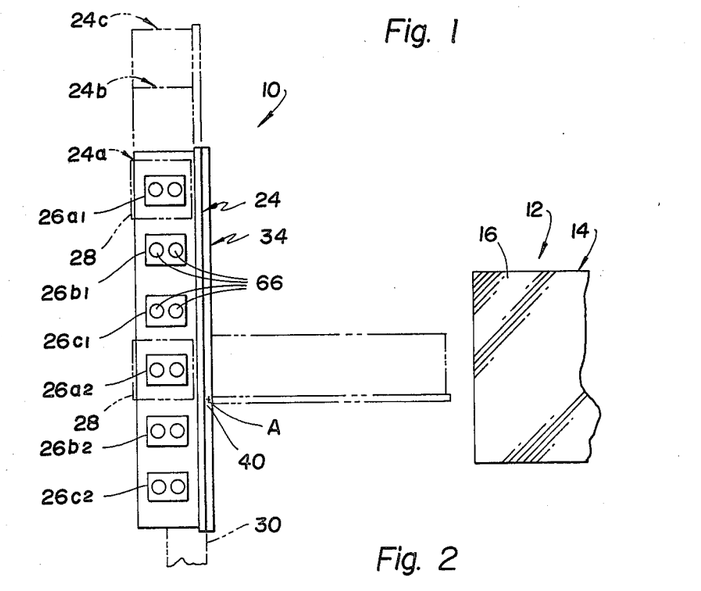
FIG. 2 is a partial side view of the in-mold label dispenser and blow molding machine taken along the direction of line 2—2 in FIG. 1.
Figure 6:
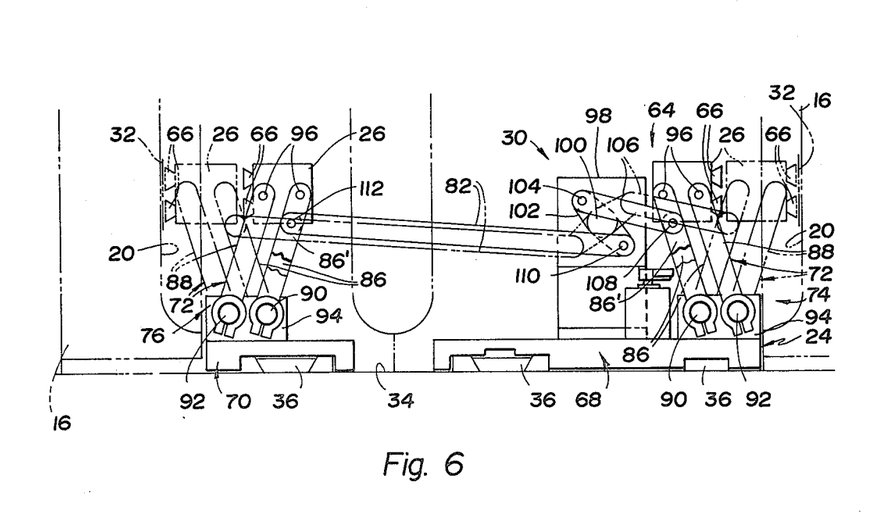
FIG. 6 is an elevation view taken generally along the direction of line 6—6 in FIG. 4 through the dispensing head to illustrate a parallelogram linkage assembly that moves label carriers on the dispensing head between retracted and extended positions as respectively illustrated by solid and phantom line representation.

Label dispenser 10 of the present invention includes a dispensing head 24 mounted for movement between the withdrawn position shown in FIG. 1 by solid line representation free of the mold 14 and an inserted position shown by phantom line representation between the mold sections 16 in the open position. A plurality of label carriers 26 are mounted on the dispensing head 24 for movement between retracted and extended positions as shown in FIG. 6. These label carriers 26 are respectively located in alignment with the cavity sections 20 of the mold sections 16 upon movement of the dispensing head 24 to the inserted position shown by phantom line representation in FIG. 1. At least one label magazine 28 as schematically indicated by phantom line representation in FIG. 2 is provided for supplying labels to the label carriers 26 prior to movement of the dispensing head 24 from the withdrawn position shown in FIG. 1 by solid line representation to the phantom line inserted position. A schematically indicated drive mechanism 30 shown in FIG. 1 moves the dispensing head 24 between the withdrawn and inserted positions and moves the label carriers 26 between the retracted and extended position to deposit labels from the magazine within the mold cavity sections in preparation for molding by an in-mold labeling operation.

Figure 8:
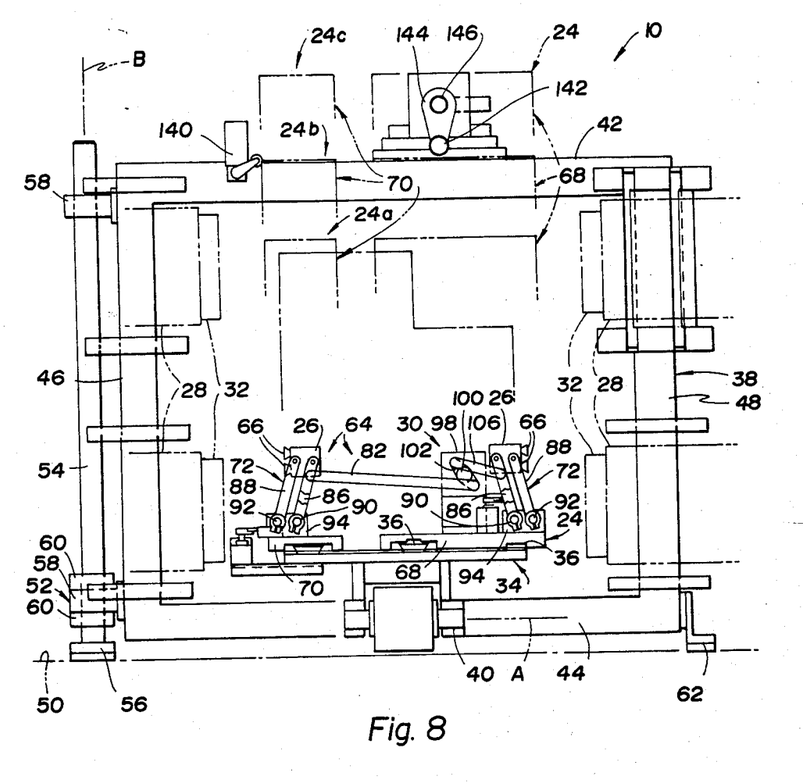
FIG. 8 is an enlarged elevation view of the in-mold label dispenser taken along the direction of line 8—8 in FIG. 1.

With combined reference to FIGS. 2 and 8, the label dispenser preferably includes at least two of the label magazines 28 located at each side of the dispensing head 24 to support stacks of labels 32. A dispensing head support 34 is also provided and has a plate-like construction including slideways 36 on which the dispensing head 24 is movable. As is hereinafter more fully described, the drive mechanism 30 initially drives the dispensing head 24 on the support 34 with the support positioned in the first vertical position of FIG. 2 as shown by phantom line representation. The driving movement of the dispensing head 24 on the support 34 is performed by drive mechanism 30 in a hesitating manner that momentarily positions the dispensing head in each of the positions 24a, 24b, and 24c illustrated. In position 24a, two of the label carriers 26a1 and 26a2 are aligned with the label magazines 28 to receive labels. Likewise, in the position 24b, two of the label carriers 26b1 and 26b2 are aligned with the pair of label magazines 28 and in position 24c two of the label carriers 26c1 and 26c2 are aligned with the label magazines 28. As each pair of label magazines is aligned with the label magazines 28, the drive mechanism moves the label carriers to receive labels therefrom, as is hereinafter more fully described, in preparation for the molding operation.

It should also be noted that the label magazines 28 are spaced from each other with a spacing equivalent to that necessary to accommodate one or more label carrier locations between the magazines. Such spacing allows the label carriers 26 to receive labels of a sufficient dimension along the direction of dispensing head movement such that the labels overlap each other. Upon subsequent positioning of the labels within the mold cavity sections, the curvatures of the cavity sections receive the entire extent of each label without any overlapping. Use of at least a pair of the label magazines allows the initial securement of the label to all of the label carriers 26 to be performed more readily than would be possible with only a single label magazine.

Figure 7:
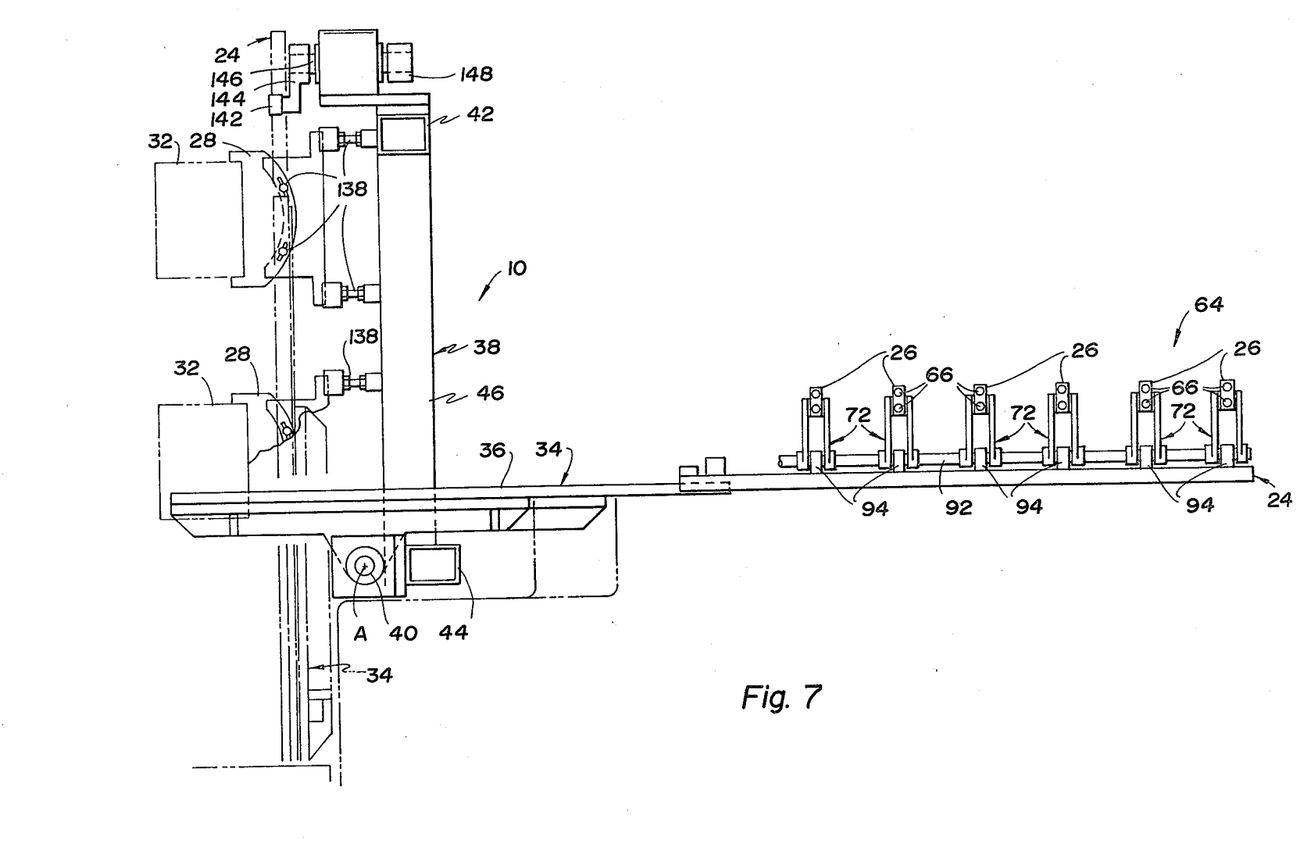
FIG. 7 is an enlarged side view of the label dispenser taken in the same direction as FIG. 2.

As seen in FIGS. 7 and 8, the label dispenser includes a frame 38 on which the dispensing head support 34 is mounted preferably by a pivotal connection 40. This mounting of the dispensing head support 34 permits the initial positioning thereof in the first generally vertically extending position of FIG. 7 during which the labels are secured to the label carriers as previously described. Thereafter, the dispensing head support 34 is moved to the second generally horizontally extending position prior to movement of the dispensing head from the withdrawn position to the inserted position between the mold sections are previously described. A suitable actuator which is not illustrated moves the dispensing head support 34 about a generally horizontal axis A of the pivotal connection 40 in coordination with the drive mechanism 30 that operates the dispensing head 24. As illustrated in FIG. 8, the frame 38 has a generally rectangular construction including a horizontally extending upper member 42, a horizontally extending lower member 44 on which the pivotal connection 40 is located, and a pair of vertically extending side members 46 and 48.

With combined reference to FIGS. 1 and 8, the label dispenser includes a base 50 and a connection 52 that mounts the dispensing head frame 38 for movement on the base. Dispensing head frame 38 is movable between the use position illustrated by solid line representation in FIG. 1 adjacent the blow molding machine 12 and an access position as illustrated partially by phantom line representation in order to selectively allow access to the blow molding machine for servicing such as maintenance or repair. Connection 52 is preferably of the pivotal type and supports the dispensing head frame 38 for movement about a generally vertical rotational axis B in a pivotal manner on base 50. A shaft 54 of the connection 52 has a lower end with a suitable mount 56 on the base 50. Connection lugs 58 are secured to the one side member 46 of the dispensing head frame 38 and have suitable apertures for receiving the shaft 54 in order to permit the pivotal movement of the frame. Upper and lower spacers 60 position the lower lug 58 with respect to the shaft. A slide foot 62 located adjacent the frame side member 48 provides support of the frame in either the use or access position as well as during movement between these positions.

With combined references to FIGS. 3, 4, 6, and 8, the drive mechanism 30 includes a parallelogram linkage assembly 64 that supports the label carriers 26 on the dispensing head 24 for movement between the retracted and extended positions as respectively illustrated by solid and phantom line representation in FIG. 6. Each carrier includes a pair of label cups 66 that are connected to a suitable vacuum line to secure an associated label 32. Initially, the linkage assembly 64 positions the vacuum carriers 26 in the retracted position as the dispensing head 24 is moved in the hesitating manner previously described in connection with FIG. 2 between the positions shown at 24a, 24b, and 24c. Upon each hesitation in each position, the linkage asssembly 64 moves the label carriers 26 outwardly to the extended positions where the vacuum cup 66 are positioned adjacent the label magazines 28 to receive associated labels. Thereafter with the label carriers 26 in the retracted position, the dispensing head support 34 is moved from the vertical position of FIG. 2 to the horizontal position with the dispensing head still positioned in the withdrawn position with respect to the mold 14. Drive mechanism 30 is then operated to move the dispensing head 24 from the withdrawn position as indicated by solid line representation in FIG. 1 to the inserted position as indicated by phantom line representation between the mold sections 16 in the open position. Operation of the drive mechanism then actuates the linkage assembly 64 to move the label carriers 26 from the retracted position shown by solid line representation in FIG. 6 to the extended position shown by phantom line representation. Such linkage assembly movement positions the labels 32 in proximity to the mold cavity sections 20. A suitable vacuum is then drawn at the mold cavity sections 20 and the suction of the vacuum cups 66 is released such that the labels are then deposited on the mold. Linkage assembly 64 is then operated such that its label carriers 26 are moved back to the retracted position and the dispensing head 24 is then driven back from the inserted position to the withdrawn position to permit pivoting of the dispensing head support 34 from the horizontal position to the vertical position shown in FIG. 2 in preparation for the next cycle. It should be noted that the vertical movement of the dispensing head 24 during the label pickup reduces the required floor space for the label dispenser while still permitting the dispensing head movement for pickup in the efficient manner previously described that permits the labels to overlap each other if necessary due to the size of the labels being used.

Figure 3:
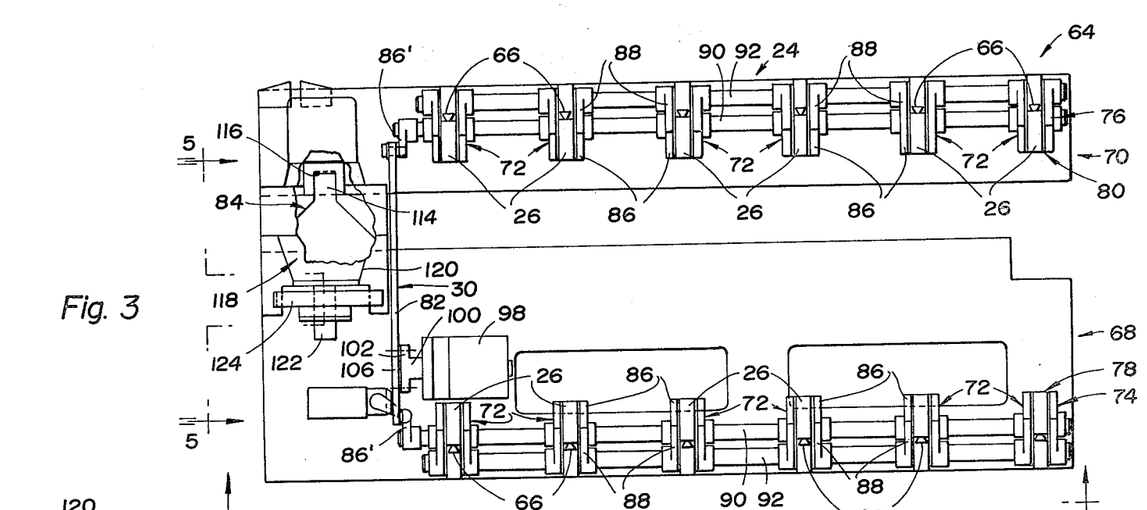
FIG. 3 is an enlarged plan view of a dispensing head of the label dispenser taken in the same direction as FIG. 1.

With specific reference to FIGS. 3 and 6, the dispensing head 24 preferably includes first and second sections 68 and 70. Parallelogram linkage assembly 64 includes parallelogram linkages 72 that are arranged as best illustrated in FIG. 3 in first and second sets 74 and 76 for respectively mounting first and second sets 78 and 80 of the label carriers 26 on the first and second sections 68 and 70 of the dispensing head 24. The first and second sets of label carriers 78 and 80 are moved by the first and second linkage sets 74 and 76 in opposite directions as each other between the retracted and extended positions in order to supply labels to the cavity sections of both mold sections in the manner illustrated in FIG. 6. A detachable connector 82 of linkage assembly 64 connects the first and second linkage sets 74 and 76 on the first and second sections 68 and 70 of dispensing head 24 to coordinate movement of the first and second sets of label carriers 78 and 80 between the retracted and extended positions. Detachment of connector 82 disconnects the first linkage set 74 from the second linkage set 76 when labels are to be supplied to only the cavity sections of one mold section. A detachable connection 84 illustrated in FIG. 3 permits detachment of the first and second sections 68 and 70 of the dispensing head to permit the second dispensing head section to be removed when labels are to be supplied to only the cavity sections of one mold section. Thus, the label dispenser can be utilized when only a single label is to be supplied to each blow molded piece on one side thereof or when labels are to be supplied to both sides thereof by application to both sections of the associated mold cavity prior to molding.

Figure 4:
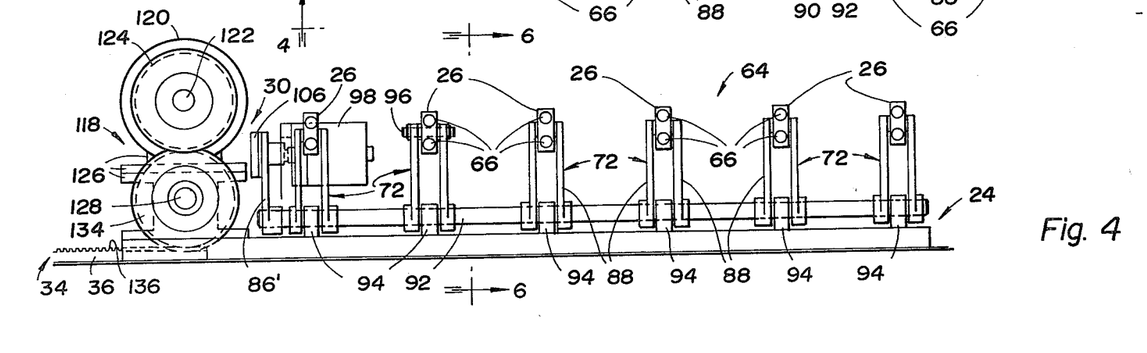
FIG. 4 is a side view of the dispensing head taken along the direction of line 4—4 in FIG. 3.

As illustrated in FIGS. 3, 4, and 6, each parallelogram linkage 72 includes two pairs of links 86 and 88 located on opposite sides of the associated label carrier 26. Lower ends of the links 86 and 88 are supported by a pair of connecting rods 90 and 92 which are mounted on the associated dispensing head section 68 or 70 by support lugs 94. At least one of the rods 90 of each dispensing head section 68 and 70 is fixed to the lower end of the associated set of links 86 such that the pair of rods 90 interconnect the associated set of linkages 74 and 76 to coordinate the movement thereof between the retracted and extended positions as previously described. Support lugs 94 are located between the lower ends of the links 86 and 88 in alignment with the label carriers 26 adjacent the upper ends of these links. Suitable connection pins 96 (FIG. 6) support the label carriers 26 on the upper ends of links 86 and 88 in order to complete the parallelogram linkages that support the label carriers for the movement described. It is also possible for the pair of rods 92 associated with the dispensing head sections 68 and 70 to be fixed to the lower ends of the associated links 88. However, rods 92 can also be freewheeling with respect to the associated link ends with the interconnection of the linkages provided only by the rods 90.

As best illustrated in FIG. 6 drive mechanism 30 includes an actuator 98 that drives the linkage assembly 64 to move the label carriers 26 between the retracted and extended positions. Actuator 98 may be of any suitable type such as a rotary air motor and includes an output 100 having a link 102 that is rotated by operation of the actuator under the control of suitable circuitry. One end of link 102 has a pivotal connection 104 to one end of a link 106 whose other end has a pivotal connection 108 to a link 86'. This link 86' is fixed to the connecting rod 90 on the dispensing head section 68 such that rotation of the link 102 moves the first linkage set 74 (FIG. 3) on the dispensing head section 68. The other end of link 102, as shown in FIG. 6, has a detachable pivotal connection 110 to one end of the detachable connector 82 whose other end has a pivotal connection 112 to another link 86' which, as best seen in FIG. 3, is fixed to the connecting rod 90 on the second dispensing head section 70. Rotation of the link 102 moves connector 82 in order to move the second linkage set 76 between the retracted and extended positions as previously described on the second dispensing head section 70.

When labels are only required on one of the mold sections 16, the second dispensing head section 70 is normally removed from the first dispensing head section 68 by detachment of the connection 84 shown in FIG. 3. This connection 84 includes a tang 114 on the first dispensing head section 68 and a slot 116 in the second dispensing head section 70. Tang 114 and slot 116 are interengaged to move the first and second dispensing head sections 68 and 70 with each other during the movement of the dispensing head as previously described. Upon removal of the second dispensing head section 70, the slot 116 is released from the tang 114 such that only the first dispensing head section 68 is driven by the drive mechanism 30. Upon such removal the pivotal connection 110 shown in FIG. 6 is detached to release the connector 82 from the actuator link 102 such that actuator 98 operates only the first linkage set on the dispensing head section 68.

Figure 5:
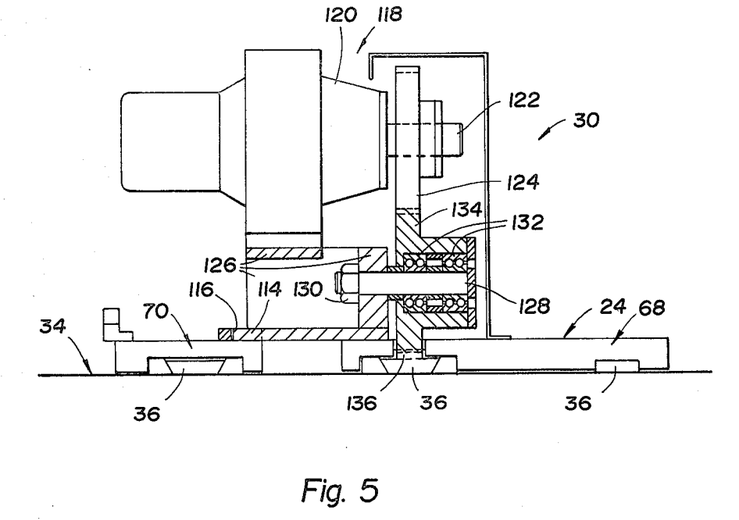
FIG. 5 is an end view of the dispensing head taken partially in section along line 5—5 in FIG. 3 to illustrate a rack and gear drive for the dispensing head.

With reference to FIG. 5, drive mechanisms 30 includes a rack and gear drive 118 that moves the dispensing head 24 between the withdrawn position and the inserted position between the mold sections of the mold as previously described and also moves the dispensing head for its hesitating movement as the labels are received from the label magazines. Drive 118 is disclosed as including a motor 120 which is of the air driven type having a rotary output 122 that drives a gear 124. Motor 120 is mounted on the first dispensing head section 68 by a plurality of plates 126 that are secured in any suitable manner such as by welding. A shaft 128 is secured by a nut connection 130 to one of the plates 126 and supports a pair of antifriction bearings 132 on which a gear 134 is rotatably mounted in meshing engagement with the output gear 124 on motor 120. The one slideway 36 just below shaft 128 includes a rack 136 that is meshed with the gear 134. As such, driving operation of the motor 120 rotates its output gear 124 and gear 134 to provide movement of the dispensing head 24 along the dispensing head support 34. As viewed in FIG. 4, counterclockwise rotation of the output gear 124 drives the gear 134 clockwise to move the dispensing head 24 toward the right along the support 34. Clockwise rotation of the output gear 124 drives the gear 134 counterclockwise to move the dispensing head 24 toward the left along support 34.

As seen in FIG. 7, each of the label magazines 28 includes adjustable connections 138 for providing adjustable mounting thereof on the frame 38. Such adjustable connections 138 permit the labels 32 to be accurately positioned to be received by the label carriers in the manner previously described in preparation for the molding operation.

Figure 9:
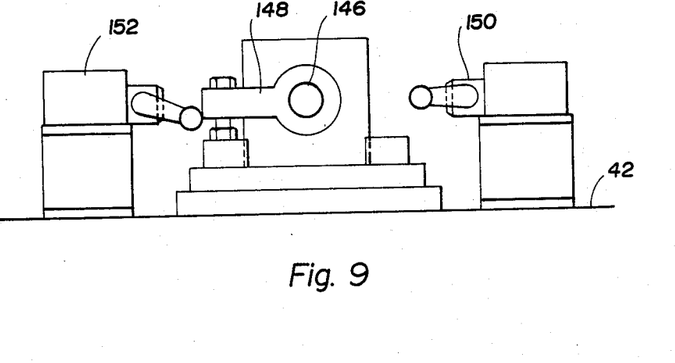
FIG. 9 is a view taken in the opposite direction as FIG. 8 adjacent the upper extremity of the label dispenser to illustrate a control that governs movement of the dispensing head as labels are received by label carriers on the dispensing head.

With reference to FIG. 8, the first two pairs of labels 32 are secured in the manner previously described with the dispensing head in the initial position indicated by 24a. Drive mechanism 30 is operated by way of the rack and gear drive previously described in order to move the dispensing head to the second position 24b where a limit switch 140 is actuated to provide hesitation of the dispensing head as the second pair of labels are secured. Thereafter, driving movement of the dispensing head toward the position 24c engages the dispensing head with a cam follower 142 which is supported by an arm 144 for rotation about a pin 146 on the upper member 42 of frame 38. Arm 144 is then rotated counterclockwise as viewed in FIG. 8 which is in a clockwise direction as viewed in FIG. 9. A switch actuator 148 is illustrated in FIG. 9 mounted on the pin 146. Actuator 148 operates a switch 150 to stop the dispensing head in the final position 24c where the last two pairs of labels are secured. Thereafter, reverse driving of the dispensing head back toward the initial position 24a operates a switch 152 at the position 24b to control the operating circuitry and, at the final position 24a, another unshown limit switch is operated to terminate the dispensing head movement. The dispensing head support 34 is then pivoted on the support frame 38 from the vertical position to the horizontal position illustrated in FIG. 2 prior to the insertion of the dispensing head to between the mold sections 16.

It should be understood, that while the best mode for carrying out the invention has been described in detail, those familiar with the art to which this invention relates will recognize various alternatives designs and embodiments for carrying out the invention as defined by the following claims.

What is claimed is:

1. An in-mold label dispenser for a blow molding machine which includes a mold having a pair of mold sections that are movable between open and closed positions and define a plurality of cavity sections that cooperatively define a plurality of mold cavities in the closed position, the label dispenser comprising: a dispensing head mounted for movement between a withdrawn position free of the mold and an inserted position between the mold sections in the open position; a plurality of label carriers mounted on the dispensing head for movement between retracted and extended positions; said label carriers being respectively located in alignment with the cavity sections of the mold sections in the open position upon movement of the dispensing head to the inserted position; a label magazine having a single stack of labels for supplying labels to a plurality of associated label carriers prior to movement of the dispensing head from the withdrawn position to the inserted position; and a drive mechanism that initially moves the dispensing head adjacent said label magazine and hesitates as each of the label carriers associated therewith moves into alignment with said label magazine whereupon the drive mechanism moves the aligned label carrier between the retracted and extended positions to secure a label thereto such that labels are secured to the associated label carriers one at a time from said label magazine, the drive mechanism thereafter moving the dispensing head between the withdrawn and inserted positions and also moving the label carriers between the retracted and extended positions to deposit the labels from the magazine within the mold cavity sections in preparation for molding.

2. A label dispenser as in claim 1 which includes at least two label magazines located at one side of the dispensing head, and a support on which the dispensing head is movable in a hesitating manner alongside the label magazines for securement of at least two labels to associated label carriers at a time and for movement between the withdrawn and inserted positions.

3. A label dispenser as in claim 2 further including a frame on which the dispensing head support is mounted for movement between a first position where the dispensing head is moved in the hesitating manner for securement of the labels to the carriers and a second position where the dispensing head is moved between the withdrawn and inserted positions.

4. A label dispenser as in claim 2 which includes a frame on which the dispensing head support is mounted for pivotal movement about a generally horizontal axis between a first generally vertically extending position where the dispensing head is moved in the hesitating manner for securement of the labels to the carriers and a second generally horizontally extending position where the dispensing head is moved between the withdrawn and inserted positions.

5. A label dispenser as in claim 3 further including a base, and a connection that mounts the dispensing head frame on the base for movement between a use position adjacent the blow molding machine and an access position that allows access to the blow molding machine for servicing.

6. An in-mold label dispenser for a blow molding machine which includes a mold having a pair of mold sections that are movable between open and closed positions and define a plurality of cavity sections that cooperatively define a plurality of mold cavities in the closed position, the label dispenser comprising: a dispensing head mounted for movement between a withdrawn position free of the mold and an inserted position between the mold sections in the open position; a plurality of label carriers mounted on the dispensing head for movement between retracted and extended positions; said label carriers being respectively located in alignment with the cavity sections of the mold sections in the open position upon movement of the dispensing head to the inserted position; at least one label magazine for supplying labels to the label carriers prior to movement of the dispensing head from the withdrawn position to the inserted position; a drive mechanism that moves the dispensing head between the withdrawn and inserted positions and that moves the label carriers between the retracted and extended positions to deposit labels from the magazine within the mold cavity sections in preparation for molding; a support on which the dispensing head is movable alongside the label magazine for securement of labels to associated label carriers and for movement between the withdrawn and inserted positions; a frame on which the dispensing head support is mounted for pivotal movement about a generally horizontal axis between a first generally vertically extending position where the dispensing head is moved for securement of the labels to the label carriers and a second generally horizontally extending position where the dispensing head is moved between the withdrawn and inserted positions; and a pivotal connection having a vertical axis of rotation about which the dispensing head frame is pivotally supported on the base for movement between a use position adjacent the blow molding machine and an access position that allows access to the blow molding machine for servicing.

7. A label dispenser as in claim 1, 2, 3, 4, 5 or 6 wherein the drive mechansim includes a parallelogram linkage assembly that supports the label carriers on the dispensing head for movement between the retracted and extended positions.

8. An in-mold label dispenser for supplying labels to a blow molding machine which includes a mold having a pair of mold sections that are movable between open and closed positions and define a plurality of cavity sections that cooperatively define a plurality of mold cavities in the closed position, the label dispenser comprising: a dispensing head mounted for movement between a withdrawn position free of the mold and an inserted position between the mold sections in the open position, the dispensing head including first and second sections, first and second sets of label carriers, a parallelogram linkage assembly including first and second sets of parallelogram linkages that respectively mount the first and second sets of the label carriers on the first and second sections of the dispensing head for movement in opposite directions relative to each other between retracted and extended positions, said first and second sets of label carriers being respectively located by the first and second parallelogram linkages in alignment with the cavity sections of the pair of mold sections in the open position upon movement of the dispensing head to the inserted position, the linkage assembly including a detachable connector for connecting the first and second sets of parallelogram linkages on the first and second sections of the dispensing head for coordinated movement of the first and second sets of label carriers between the retracted and extended positions and for disconnecting the first and second sets of parallelogram linkages when labels are to be supplied to only the cavity sections of one mold section, a detachable connection between the first and second sections of the dispensing head for permitting removal of one dispensing head section when labels are to be supplied to only the cavity sections of one mold section, a pair of label magazines for respectively supplying labels to the first and second sets of label carriers prior to movement of the dispensing head from the withdrawn position to the inserted position, and a drive mechanism that moves the dispensing head between the withdrawn and inserted positions and that moves the parallelogram linkage assembly to move the label carriers between the retracted and extended position to deposit labels from the magazine within the mold cavity sections in preparation for molding.

9. A label dispenser as in claim 8 wherein the linkage assembly includes a pair of connecting rods respectively connecting the linkages of the first and second sets of parallelogram linkages on the first and second sections of the dispensing head.

10. A label dispenser as in claim 9 wherein the drive mechanism includes an actuator that drives the linkage assembly to move the label carriers between the retracted and extended positions.

11. A label dispenser as in claim 7 wherein the drive mechanism includes a rack and gear drive that moves the dispensing head between the withdrawn and inserted positions with respect to the mold sections of the mold.

12. An in-mold label dispenser for a blow molding machine which includes a mold having a pair of mold sections that are movable between open and closed positions and define a plurality of cavity sections that cooperatively define a plurality of mold cavities in the closed position, the label dispenser comprising: a support; a dispensing head mounted on the support for movement between a withdrawn position free of the mold and an inserted position between the mold sections in the open position; a plurality of label carriers; a parallelogram linkage assembly that mounts the label carriers on the dispensing head for movement between retracted and extended positions; said label carriers being respectively located in alignment with the cavity sections of the mold sections in the open position upon movement of the dispensing head to the inserted position; a label magazine having a single stack of labels for supplying labels to a plurality of associated label carriers prior to movement of the dispensing head from the withdrawn position to the inserted position; and a drive mechanism that initially moves the dispensing head adjacent said label magazine and hesitates as each of the label carriers associated therewith moves into alignment with said label magazine whereupon the drive mechanism moves the aligned label carrier between the retracted and extended positions to secure a label thereto such that labels are secured to the associated label carriers one at a time from said label magazine, the drive mechanism thereafter moving the dispensing head between the withdrawn and inserted positions and also moving the label carriers between the retracted and extended positions to deposit the labels from the magazine within the mold cavity sections in preparation for molding.

13. An in-mold label dispenser for a blow molding machine which includes a mold having a pair of mold sections that are movable between open and closed positions and define a plurality of mold cavities in the closed position, the label dispenser comprising: a base; a frame; a pivotal connection for mounting the frame on the base for movement about a vertical axis between a use position adjacent the blow molding machine and an access position that allows access to the blow molding machine for servicing; a support mounted on the frame for pivotal movement about a generally horizontal axis between a first generally vertically extending position and a second generally horizontally extending position; a dispensing head mounted on the support for movement and being movable in a horizontal direction with the support in the second horizontally extending position between a withdrawn position free of the mold and an inserted position between the mold sections in the open position; a plurality of label carriers; a parallelogram linkage assembly that mounts the label carriers on the dispensing head for movement between retracted and extended positions; said label carriers being respectively located in alignment with the cavity sections of the mold sections in the open position upon movement of the dispensing head to the inserted position; at least one label magazine for supplying labels to the label carriers with the support in the first vertically extending position prior to movement of the support to the second horizontally extending position and movement of the dispensing head from the withdrawn position to the inserted position; and a drive mechanism that moves the dispensing head between the withdrawn and inserted positions and that moves the label carriers between the retracted and extended positions to deposit labels from the magazine within the mold cavity sections in preparation for molding.

14. An in-mold label dispenser for a blow molding machine which includes a mold having a pair of mold sections that are movable between open and closed positions and define a plurality of cavity sections that cooperatively define a plurality of mold cavities in the closed position, the label dispenser comprising: a base; a frame; a pivotal connection for mounting the frame on the base for movement about a vertical axis between a use position adjacent the blow molding machine and an access position that allows access to the blow molding machine for servicing; a support mounted on the frame for pivotal movement about a generally horizontal axis between a first generally vertically extending position and a second generally horizontally extending position; a dispensing head mounted on the support for movement and being movable in a horizontal direction with the support in the second horizontally extending position between a withdrawn position free of the mold and an inserted position between the mold sections in the open position; first and second sets of label carriers; a parallelogram linkage assembly that mounts the first and second sets of label carriers on the dispensing head for movement in opposite directions as each other between retracted and extended positions; said label carriers being respectively located in alignment with the cavity sections of the mold sections in the open position upon movement of the dispensing head to the inserted position; at least one label magazine located on each side of the dispensing head to supply labels to the first and second sets of label carriers with the support in the first vertically extending position prior to movement of the support to the second horizontally extending position and movement of the dispensing head from the withdrawn position to the inserted position; and a drive mechanism that moves the dispensing head between the withdrawn and inserted positions and that moves the label carriers between the retracted and extended positions to deposit labels from the magazine within the mold cavity sections of both mold sections in preparation for molding.

15. An in-mold label dispenser for a blow molding machine which includes a mold having a pair of mold sections that are movable between open and closed positions and define a plurality of cavity sections that cooperatively define a plurality of mold cavities in the closed position, the label dispenser comprising: a base; a frame mounted on the base for movement about a vertical axis between a use position adjacent the blow molding machine and an access position that allows access to the blow molding machine for servicing; a support mounted on the frame for pivotal movement about a horizontal axis between horizontal and vertical positions; a dispensing head mounted on the support for movement in a horizontal direction with the support in the horizontal position between a withdrawn position free of the mold and an inserted position between the mold sections in the open position; a plurality of label carriers; a parallelogram linkage assembly that mounts the label carriers on the dispensing head for movement between retracted and extended positions; said label carriers being respectively located in alignment with the cavity sections of the mold sections in the open position upon movement of the dispensing head to the inserted position; a label magazine having a single stack of labels for supplying labels to a plurality of associated label carriers a drive mechanism including a rack and gear drive that initially moves the dispensing head in a hesitating manner adjacent said label magazine with the support in the vertical position; each of the label carriers associated with said label magazine being aligned therewith during one hesitation whereupon extending and retracting movement of the aligned label carrier secures a label thereto such that the labels are secured to the associated label carriers one at a time from said label magazine; the rack and gear drive thereafter moving the dispensing head between the withdrawn and inserted positions; and the drive mechanism also including an actuator that moves the label carriers between the retracted and extended positions to supply labels thereto from the label magazine and to deposit the labels from the magazine within the mold cavity sections in preparation for molding.

16. An in-mold label dispenser for a blow molding machine which includes a mold having a pair of mold sections that are movable between open and closed positions and define a plurality of cavity sections that cooperatively define a plurality of mold cavities in the closed position, the label dispenser comprising: a base; a frame mounted on the base for movement about a vertical axis between a use position adjacent the blow molding machine and an access position that allows access to the blow molding machine for servicing; a support mounted on the frame for pivotal movement between horizontal and vertical positions; a dispensing head mounted on the support for movement in a horizontal direction with the support in the horizontal position between a withdrawn position free of the mold and an inserted position between the mold sections in the open position; a detachable connection that secures the first and second sections of the dispensing head to each other to permit one dispensing head section to be removed when labels are to be supplied to only one section of the mold; first and second sets of label carriers; a parallelogram linkage assembly that respectively mounts the first and second sets of label carriers on the first and second sections of the dispensing head for movement in opposite directions relative to each other between retracted and extended positions; said linkage assembly including a detachable connector for connecting the first and second sets of label carriers on the first and second sections of the dispensing head for coordinated movement with each other between the retracted and extended positions and for disconnecting the first and second sets of label carriers when the labels are to be supplied to only one mold section; said label carriers being respectively located in alignment with the cavity sections of the mold sections in the open position upon movement of the dispensing head to the inserted position; at least one label magazine located on each side of the dispensing head to supply labels to the label carriers upon hesitating movement of the dispensing head in a vertical direction on the support with the support in the vertical position prior to movement of the support to the horizontal position and subsequent movement of the dispensing head from the withdrawn position to the inserted position; and a drive mechanism including a rack and gear drive that moves the dispensing head between the withdrawn and inserted positions and also including an actuator that moves the label carriers between the retracted and extended positions to deposit labels from the magazine within the mold cavity sections in preparation for molding.

* * * * *